United States Patent
Kiyosawa et al.

(10) Patent No.: US 10,295,037 B2
(45) Date of Patent: May 21, 2019

(54) DUAL-TYPE STRAIN WAVE GEARING

(71) Applicant: HARMONIC DRIVE SYSTEMS INC., Shinagawa-ku, Tokyo (JP)

(72) Inventors: Yoshihide Kiyosawa, Azumino (JP); Jun Handa, Azumino (JP); Noboru Takizawa, Azumino (JP); XinYue Zhang, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 274 days.

(21) Appl. No.: 15/327,830

(22) PCT Filed: Jul. 3, 2015

(86) PCT No.: PCT/JP2015/069243
§ 371 (c)(1),
(2) Date: Jan. 20, 2017

(87) PCT Pub. No.: WO2016/013379
PCT Pub. Date: Jan. 28, 2016

(65) Prior Publication Data
US 2017/0211677 A1 Jul. 27, 2017

(30) Foreign Application Priority Data
Jul. 23, 2014 (JP) ................. 2014-149371

(51) Int. Cl.
*F16H 49/00* (2006.01)
*F16H 1/32* (2006.01)
*F16H 55/12* (2006.01)

(52) U.S. Cl.
CPC .............. *F16H 49/001* (2013.01); *F16H 1/32* (2013.01); *F16H 55/12* (2013.01); *F16H 2049/003* (2013.01)

(58) Field of Classification Search
CPC .......... F16H 49/001; F16H 1/32; F16H 55/12; F16H 2049/003
See application file for complete search history.

(56) References Cited

U.S. PATENT DOCUMENTS 2,930,254 A * 3/1960 Musser ................. F16H 49/001
74/640
4,776,708 A * 10/1988 Carlson ................. F16H 49/001
384/447

(Continued)

FOREIGN PATENT DOCUMENTS

JP  01-91151 U  6/1989
JP  02-275147 A  11/1990

(Continued)

OTHER PUBLICATIONS

International Search Report (PCT/ISA/210) dated Sep. 29, 2015, by the Japanese Patent Office as the International Searching Authority for International Application No. PCT/JP2015/069244.

(Continued)

*Primary Examiner* — Zakaria Elahmadi
(74) *Attorney, Agent, or Firm* — Buchanan Ingersoll & Rooney PC (57) ABSTRACT

An externally toothed gear of a dual-type strain wave gearing is provided with first and second external teeth having different tooth numbers, and is flexed into an ellipsoidal shape by a wave generator. When the theoretical values of the radial flexing amounts at major-axis positions of the first and second external teeth flexed into the ellipsoidal shape are expressed by $d1=m1n1$ and $d2=m2n2$ (m1 and m2 represent the modules of the first and second external teeth, and n1 and n2 represent positive integers), the radial flexing amount of the first and second external teeth flexed by the wave generator satisfies $d=(d1+d2)/\omega$ ($1.4 \leq \omega \leq 2.6$). Accordingly, a dual-type strain wave gearing (Continued)

can be achieved with which the first and second external teeth having different numbers can be suitably flexed to form excellent mating states with respective internally toothed gears.

6 Claims, 4 Drawing Sheets

(56) References Cited

U.S. PATENT DOCUMENTS

| | | | | |
|---|---|---|---|---|
| 5,918,508 | A * | 7/1999 | Ishikawa | F16H 55/0833 475/180 |
| 7,530,292 | B2 * | 5/2009 | Ishikawa | F16H 55/0833 74/640 |
| 8,661,939 | B2 * | 3/2014 | Ishikawa | F16H 55/0833 74/462 |
| 9,435,418 | B2 * | 9/2016 | Hoshina | F16C 19/44 |
| 9,470,301 | B2 * | 10/2016 | Kuo | F16H 49/001 |
| 10,006,534 | B2 * | 6/2018 | Murayama | F16H 49/001 |
| 2005/0044986 | A1 * | 3/2005 | Ishikawa | F16H 55/0833 74/640 |
| 2005/0059524 | A1 * | 3/2005 | Hori | F16H 1/32 475/180 |
| 2007/0022838 | A1 * | 2/2007 | Ishikawa | F16H 55/0833 74/640 |
| 2008/0173130 | A1 * | 7/2008 | Zhang | F16H 49/001 74/640 |
| 2009/0139358 | A1 * | 6/2009 | Ishikawa | F16H 55/0833 74/461 |
| 2011/0088496 | A1 * | 4/2011 | Cho | F16H 49/001 74/411 |
| 2012/0304791 | A1 * | 12/2012 | Ishikawa | F16H 49/001 74/412 R |
| 2013/0045827 | A1 * | 2/2013 | Kobayashi | F16H 1/32 475/149 |
| 2014/0047937 | A1 * | 2/2014 | Ishikawa | F16H 49/001 74/412 R |
| 2014/0217855 | A1 * | 8/2014 | Shibamoto | F16H 49/001 310/339 |
| 2016/0061308 | A1 * | 3/2016 | Oishi | F16H 49/001 74/640 |

FOREIGN PATENT DOCUMENTS

| | | |
|---|---|---|
| JP | 2718540 B2 | 2/1998 |
| JP | 2009-156462 A | 7/2009 |
| JP | 2011-112214 A | 6/2011 |
| JP | 2013-194836 A | 9/2013 |
| WO | WO 2013/038463 A1 | 3/2013 |

OTHER PUBLICATIONS

Written Opinion (PCT/ISA/237) dated Sep. 29, 2015, by the Japanese Patent Office as the International Searching Authority for International Application No. PCT/JP2015/069244.

* cited by examiner

DUAL-TYPE STRAIN WAVE GEARING

TECHNICAL FIELD

The present invention relates to a strain wave gearing which has a pair of internally toothed gears, a cylindrical externally toothed gear capable of flexing in a radial direction, and a wave generator.

BACKGROUND ART

Strain wave gearings having cylindrical externally toothed gears are typically provided with a stationary-side internally toothed gear secured so as not to rotate, a wave generator that is a rotation-inputting element, a drive-side internally toothed gear that is a reduced-rotation-outputting element, and a cylindrical externally toothed gear capable of flexing in the radial direction and meshing with the stationary-side internally toothed gear and drive-side internally toothed gear. In typical strain wave gearings, the externally toothed gear is caused to flex into an ellipsoidal shape, the ellipsoidally flexed externally toothed gear meshing with the stationary-side and drive-side internally toothed gears at both end positions along the major axis of the ellipsoidal shape.

Patent Document 1 discloses a typical strain wave gearing in which the number of teeth of the stationary-side internally toothed gear is two greater than that of the externally toothed gear, and the number of teeth of the drive-side internally toothed gear is equal to that of the externally toothed gear. The external teeth of the externally toothed gear are bisected at the tooth-trace-direction central portion thereof, one of the external-tooth portions being capable of meshing with the stationary-side internally toothed gear, and the other of the external-tooth portions being capable of meshing with the drive-side internally toothed gear. When the wave generator rotates, the externally toothed gear is rotated at a speed ratio according to the difference in number of teeth between the externally toothed gear and the stationary-side internally toothed gear. The reduced-speed rotation of the externally toothed gear is outputted from the drive-side internally toothed gear integrally rotating with the externally toothed gear.

Patent Document 2 discloses a strain wave gearing in which the number of teeth of the stationary-side internally toothed gear is two greater than that of the externally toothed gear, and the number of teeth of the drive-side internally toothed gear is two less than that of the externally toothed gear. In this strain wave gearing, when the wave generator rotates, the externally toothed gear rotates more slowly at a speed ratio corresponding to the difference in the number of teeth with respect to the stationary-side internally toothed gear. The rotation of the externally toothed gear is increased at a speed ratio corresponding to the difference in number of teeth between the externally toothed gear and the drive-side internally toothed gear, and is outputted from the drive-side internally toothed gear. The rotation outputted from the drive-side internally toothed gear is reduced at a speed ratio of less than 50 in relation to the rotation inputted to the wave generator.

Patent Documents 2 and 3 disclose strain wave gearings having wave generators that have two rows of ball bearings. This type of wave generator is configured from a rigid plug having an ellipsoidally contoured outer-peripheral surface, and two rows of ball bearings fitted to the outer-peripheral surface. The flexible externally toothed gear is pressed radially outward by the two major-axis end portions of the outer-peripheral surfaces of the ellipsoidally flexed outer races of the ball bearings, and the meshing of the flexible externally toothed gear with respect to the first and second rigid internally toothed gears is sustained.

PRIOR ART DOCUMENTS

Patent Documents

Patent Document 1: JP-A 2011-112214
Patent Document 2: JP-A 02-275147
Patent Document 3: JP-U 01-91151

SUMMARY OF THE INVENTION

Problems to be Solved by the Invention

It is considered that in the externally toothed gear used herein, first teeth capable of meshing with one first internally toothed gear and second teeth capable of meshing with another second internally toothed gear are formed in the outer-peripheral surface of a radially flexible cylindrical body, the second teeth differing in number from the first teeth. Adopting such a configuration makes it possible to realize a strain wave gearing having a gear ratio of less than 50 in a similar manner as in the strain wave gearing disclosed in Patent Document 2. Additionally, this configuration enables a strain wave gearing having a speed ratio of less than 50 to be designed with a greater degree of freedom than in the strain wave gearing disclosed in Patent Document 2.

In the present specification, a strain wave gearing that has an externally toothed gear in which first and second external teeth differing in number are formed in the outer-peripheral surface of a flexible cylindrical body is referred to as a "dual-type strain wave gearing."

In a dual-type strain wave gearing, first external teeth and second external teeth of an externally toothed gear are formed in the outer-peripheral surface of a shared cylindrical body, and the tooth bottom rim parts of the first and second external teeth are connected to each other. When the cylindrical body is caused by the wave generator to flex in an ellipsoidal shape, the first and second external teeth, which differ in number, respectively mesh with separate internally toothed gears.

Determination of the flexing amount of each of these external teeth has a great effect on the meshing state, wear resistance, and tooth bottom rim fatigue strength of each of the external teeth. Additionally, the flexing state of each of the external teeth has a great effect on the ball-load distribution of each of wave bearings of the wave generator, the wave bearings supporting the first and second external teeth, respectively. This also effects on the service life of these wave bearings.

When the first and second external teeth are configured as separate gears, the respective gears can be flexed into ellipsoidal shape so as to have a suitable flexing amount for each gear. Whereby it is possible for the first and second externally teeth to mesh with the corresponding internal teeth in a suitable meshing state.

However, when the dual-type strain wave gearing is concerned, since the first and second external teeth are formed on a shared cylindrical body, they cannot be made to flex independently by different flexing amounts in accordance with the numbers of these external teeth. Additionally, when the cylindrical body is made to flex by a flexing amount suitable for the one external teeth, it is not possible in some cases to maintain the meshing state of the other external teeth in an appropriate state. Further, since one of the meshing states of the first and second external teeth has effect on the other of the meshing states thereof, each of the external teeth cannot be made to flex in an appropriate state if mutual interaction between the meshing states of these external teeth is not considered.

In view of the drawbacks described above, an object of the present invention is to provide a dual-type strain wave gearing in which the first and second external teeth having different tooth numbers can be flexed appropriately to form suitable meshing states with respect to the internally toothed gears.

Another object of the present invention is to provide a dual-type strain wave gearing in which it is possible to average the bearing-ball load distribution of the wave bearing of the wave generator for supporting the first and second external teeth by flexing the first and second external teeth having different tooth numbers in a suitable manner.

Means of Solving the Problems

In order to solve the problem described above, a dual-type strain wave gearing of the present invention is characterized by including:

a rigid first internally toothed gear in which first internal teeth are formed;

a rigid second internally toothed gear in which second internal teeth are formed, the second internally toothed gear being disposed so as to be coaxially aligned in parallel with the first internally toothed gear;

a flexible externally toothed gear in which first external teeth capable of meshing with the first internal teeth and second external teeth capable of meshing with the second internal teeth are formed in the outer-peripheral surface of a radially flexible cylindrical body, the second teeth differing in number from the first teeth, and the externally toothed gear being disposed coaxially inside the first and second internally toothed gears; and a wave generator which causes the externally toothed gear to flex in an ellipsoidal shape, causing the first external teeth to partially mesh with the first internal teeth and causing the second external teeth to partially mesh with the second internal teeth, wherein, where $m_1$ is a module of the first external teeth, $m_2$ is a module of the second external teeth, $n_1$ and $n_2$ are positive integers, $2n_1$ is a difference in number of teeth between the first external teeth and the first internal teeth, and $2n_2$ is a difference in number of teeth between the second external teeth and the second internal teeth, a theoretical value $d_1$ of an amount by which the first external teeth are radially flexed at major-axis positions and a theoretical value $d_2$ of an amount by which the second external teeth are radially flexed when the external teeth are flexed in an ellipsoidal shape are respectively represented by $d_1 = m_1 n_1$ and $d_2 = m_2 n_2$;

a relationship $d = (d_1 + d_2)/\omega$ $1.4 \leq \omega \leq 2.6$ is satisfied, where d is an amount by which the first and second external teeth are radially flexed by the wave generator.

The rim-neutral circle is the circle passing through the thickness center of the cylindrical body (tooth bottom rim) in a state in which the externally toothed gear is perfectly circular prior to being flexed in an ellipsoidal shape. The rim-neutral circle is deformed in an ellipsoidal shape due to the externally toothed gear being flexed in an ellipsoidal shape. This deformed circle is referred to as the "ellipsoidal rim-neutral curve." The amount by which the externally toothed gear is radially flexed is the difference between the radius of the major axis of the ellipsoidal rim-neutral curve and the radius of the rim-neutral circle. This amount is represented by $\kappa mn$, where m is the module of the externally toothed gear, 2n is the difference in number of teeth with respect to the internally toothed gears (n being a positive integer), and $\kappa$ is the deflection coefficient. The amount mn of radial flexing when $\kappa$ equals 1 is a value obtained by dividing the pitch circle diameter of the externally toothed gear by the reduction ratio from when the rigid internally toothed gear is secured; this is the theoretical value (amount of flexing at a standard deflection) of the amount of radial flexing.

Thus, in the case of the first and second external teeth 7 and 8 that differ in number and are formed in the outer-peripheral surface of the same cylindrical body, the pitch circle diameters of the teeth on both sides are approximately equal, and therefore, the theoretical value mn of the amount of radial flexing is smaller for the external teeth that has larger number of teeth.

In the present invention, the amounts of radial flexing of the first and second external teeth that differ in number are set to be the same value as described above. The same amount of flexing is set for the both first and second external teeth as described above, so that it is possible to maintain the meshing states of both external teeth in a suitable manner, whereby enhancing the wear resistance and tooth bottom fatigue strength of the first and second external teeth.

In a case in which the wave generator is provided with two rows of wave bearings for supporting the first and second external teeth, it is possible to average the bearing-ball load distribution of each of the wave bearings. With this, the lifetime of the wave bearings can be elongated.

In the dual-type strain wave gearing of the present invention, a speed ratio R1 between the first internally toothed gear and the externally toothed gear having first external teeth, a speed ratio R2 between the second internally toothed gear and the externally toothed gear having second external teeth, and a speed ratio R of the strain wave gearing are respectively defined as follows:

$R1 = 1/\{(Zf1 - Zc1)/Zf1\}$, $R2 = 1/\{(Zf2 - Zc2)/Zf2\}$, and $R = (R1 \times R2 - R1)/(-R1 + R2)$, where Zc1 is the tooth number of the first internal teeth, Zc2 is the tooth number of the second internal teeth, Zf1 is the tooth number of the first external teeth, and Zf2 is the tooth number of the second external teeth.

According to the strain wave gearing of the present invention, it is possible to obtain a speed ratio of less than 50, e.g., a speed ratio appreciably lower than 30. Additionally, unlike in the prior art, first external teeth and second external teeth that differ in number and module are formed as the external teeth of the externally toothed gear. Accordingly, there is a greater degree of freedom in the design for setting the speed ratio, and a strain wave gearing having a low speed ratio can be realized more easily than in the prior art.

Generally, the number Zf1 of the first external teeth differs from the number Zc1 of the first internal teeth, and the number Zf2 of second external teeth differs from the number Zc2 of second internal teeth. For example, the number Zf1 of first external teeth is less than the number Zc1 of first internal teeth, and the number Zc1 of first internal teeth and the number Zc2 of second internal teeth are equal to each other.

In addition, the wave generator is set to be a rotation-inputting element; and either one of the first internally toothed gear and second internally toothed gear is set to be a stationary-side internally toothed gear secured so as not to rotate, and the other of the first internally toothed gear and second internally toothed gear is a drive-side internally toothed gear that is a reduced-rotation-outputting element.

MODE FOR CARRYING OUT THE INVENTION

An embodiment of a dual-type strain wave gearing to which the present invention is applied is described below with reference to the attached drawings.

Figure 1A:
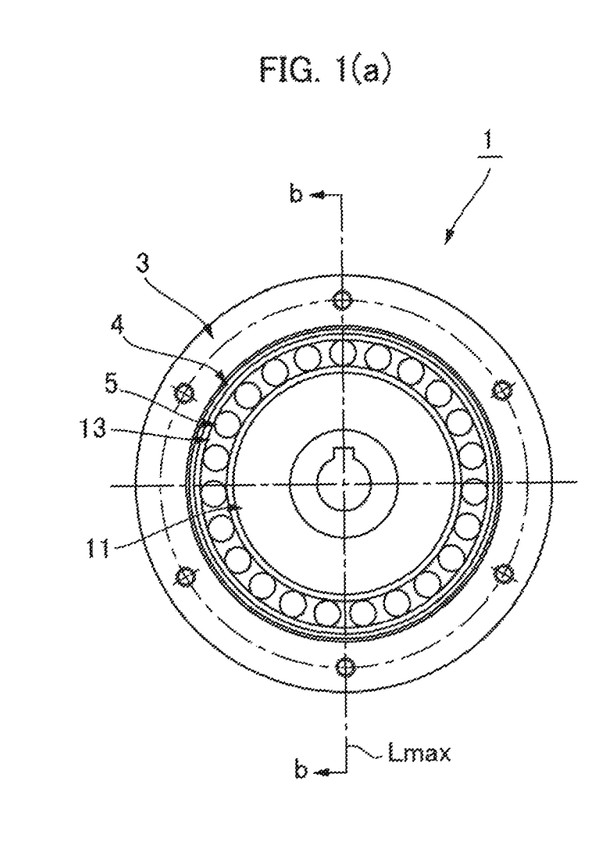
FIG. 1 is an end-surface view and a longitudinal cross-sectional view of a dual-type strain wave gearing to which the present invention is applied.
Figure 1B:
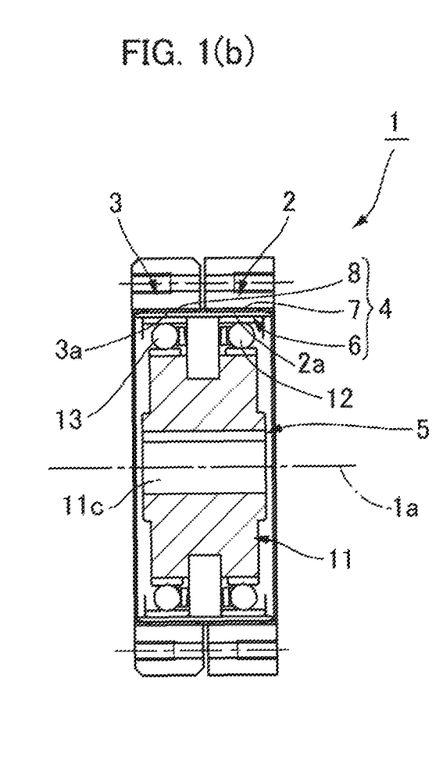
Figure 2:
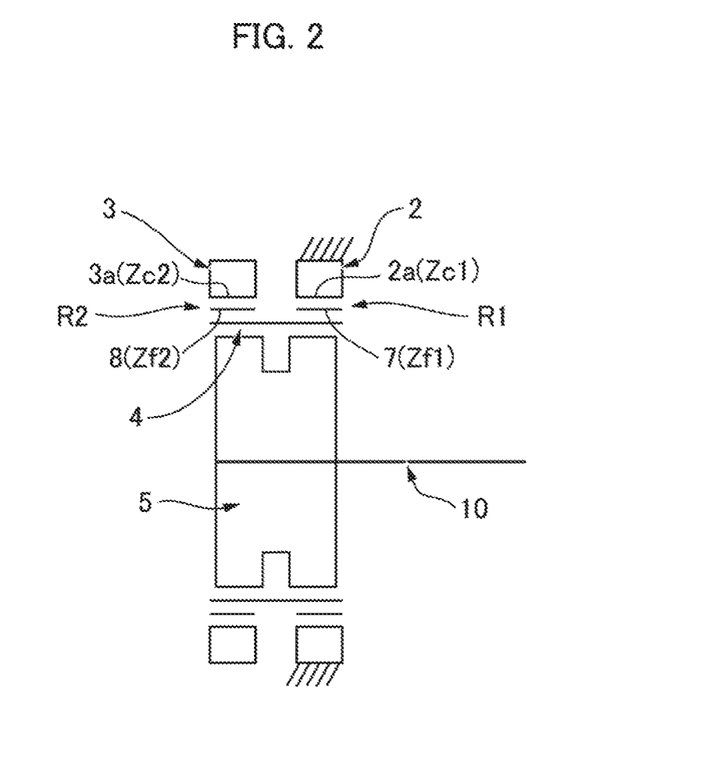
FIG. 2 is a schematic diagram of the dual-type strain wave gearing shown in FIG. 1.

FIG. 1 is an end-surface view and a longitudinal cross-sectional view showing a dual-type strain wave gearing (referred to below simply as "strain wave gearing") according to an embodiment of the present invention, and FIG. 2 is a schematic diagram of the same. The strain wave gearing 1, which is used as, e.g., a gear reducer, has an annular rigid first internally toothed gear 2, an annular rigid second internally toothed gear 3, a cylindrical flexible externally toothed gear 4 comprising a radially flexible thin-walled elastic body, and an ellipsoidally contoured wave generator 5.

The first and second internally toothed gears 2, 3 are disposed so as to be coaxially aligned in parallel with each other, with a prescribed gap therebetween, along the direction of a central axis 1a. In the present example, the first internally toothed gear 2 is a stationary-side internally toothed gear secured so as not to rotate, the number of first internal teeth 2a thereof being indicated by Zc1. The second internally toothed gear 3 is a rotatably supported drive-side internally toothed gear, the number of second internal teeth 3a thereof being indicated by Zc2. The second internally toothed gear 3 is the reduced-rotation-outputting element of the strain wave gearing 1.

The cylindrical externally toothed gear 4 is disposed coaxially inside the first and second internally toothed gears 2, 3. The externally toothed gear 4 has a cylindrical body 6 that is a radially flexible thin-walled elastic body, first external teeth 7 and second external teeth 8 formed in the circular outer-peripheral surface of the cylindrical body 6, and a gap 9 (refer to FIG. 3) formed between the external teeth 7, 8 on either side, the gap 9 functioning as a cutter clearance area. The first external teeth 7 are formed on one side along the central axis 1a direction of the circular outer-peripheral surface of the cylindrical body 6, and the second external teeth 8 are formed on the other second-internal-teeth 3a side of the circular outer-peripheral surface. The first and second external teeth 7, 8 are formed such that the central-axis 1a direction is the tooth trace direction.

Specifically, the first external teeth 7 are formed on the side opposing the first internal teeth 2a, and are capable of meshing with the first internal teeth 2a, the number of first external teeth 7 being indicated by Zf1. The second external teeth 8 are formed on the side opposing the second internal teeth 3a, and are capable of meshing with the second internal teeth 3a, the number of second external teeth 8 being indicated by Zf2. The numbers Zf1, Zf2 of teeth are different from each other.

The wave generator 5 has an ellipsoidally contoured rigid plug 11, and a first wave bearing 12 and second wave bearing 13, the first and second wave bearings being fitted to the ellipsoidal outer-peripheral surface of the rigid plug 11. The first and second wave bearings 12, 13 are formed from ball bearings.

The wave generator 5 is inserted into the inner-peripheral surface of the cylindrical body 6 of the externally toothed gear 4, and causes the cylindrical body 6 to flex in an ellipsoidal shape. Therefore, the first and second external teeth 7, 8 are also flexed in an ellipsoidal shape. The ellipsoidally flexed externally toothed gear 4 meshes with the first and second internally toothed gears 2, 3 at both end positions along the major axis Lmax of the ellipsoidal shape. Specifically, the first external teeth 7 mesh with the first internal teeth 2a at both end positions along the major axis of the ellipsoidal shape, and the second external teeth 8 mesh with the second internal teeth 3a at both end positions along the major axis.

The wave generator 5 is the rotation-input element of the strain wave gearing 1. The rigid plug 11 of the wave generator 5 has a shaft hole 11c, in which an input rotation shaft 10 (refer to FIG. 2) is securely connected in a coaxial arrangement. For example, a motor output shaft may be securely connected in a coaxial arrangement in the shaft hole 11c. When the wave generator 5 rotates, the positions at which the first external teeth 7 of the externally toothed gear 4 and the stationary-side first internal teeth 2a mesh, and the positions at which the second external teeth of the externally toothed gear 4 and the drive-side second internal teeth 3a mesh, move along the circumferential direction.

The number Zf1 of first external teeth 7 and the number Zf2 of second external teeth 8 differ from each other; in the present example, the number Zf2 of second external teeth is greater. The number Zc1 of first internal teeth 2a and the number Zf1 of first external teeth 7 also differ from each other; in the present example, the number Zc1 of first internal teeth 2a is greater. The number Zc2 of second internal teeth 3a and the number Zf2 of second external teeth 8 differ from each other; in the present example, the number Zc2 of second internal teeth 3a is less.

In the present example, the externally toothed gear 4 is caused to flex in an ellipsoidal shape, and meshes with the internally toothed gears 2, 3 at two locations along the circumferential direction. Therefore, the difference between the number Zc1 of first internal teeth 2a and the number Zf1 of first external teeth 7 is $2n_1$, where $n_1$ is a positive integer. The difference between the number Zc2 of second internal teeth 3a and the number Zf2 of second external teeth 8 is $2n_2$, where $n_2$ is a positive integer.

$$Zc1 = Zf1 + 2n_1$$

$$Zc2 = Zf2 - 2n_2$$

In a specific example, the numbers of teeth are set as follows ($n_1 = n_2 = 1$):

$$Zc1 = 62$$

$$Zf1 = 60$$

$$Zc2 = 62$$

$$Zf2 = 64$$

The speed ratio R1 between the first internally toothed gear 2 and the first external teeth 7, and the speed ratio R2 between the second internally toothed gear 3 and the second external teeth 8, are respectively defined as follows:

$$i1 = 1/R1 = (Zf1 - Zc1)/Zf1 = (60-62)/60 = -1/30$$

$$i2 = 1/R2 = (Zf2 - Zc2)/Zf2 = (64-62)/64 = 1/32$$

Therefore, R1=−30, and R2=32.

The speed ratio R of the strain wave gearing 1 is represented by the following formula using the speed ratios R1, and R2. Thus, according to the present invention, a strain wave gearing having a dramatically low speed ratio (low reduction ratio) can be realized (a negative speed ratio indicates that output rotation progresses in the direction opposite that of input rotation).

$$\begin{aligned}R &= (R1 \times R2 - R1)/(-R1 + R2) \\ &= (-30 \times 32 + 30)/(30 + 32) \\ &= -930/62 \\ &= -15\end{aligned}$$

(Gap: Cutter Clearance Area)

Figure 3:
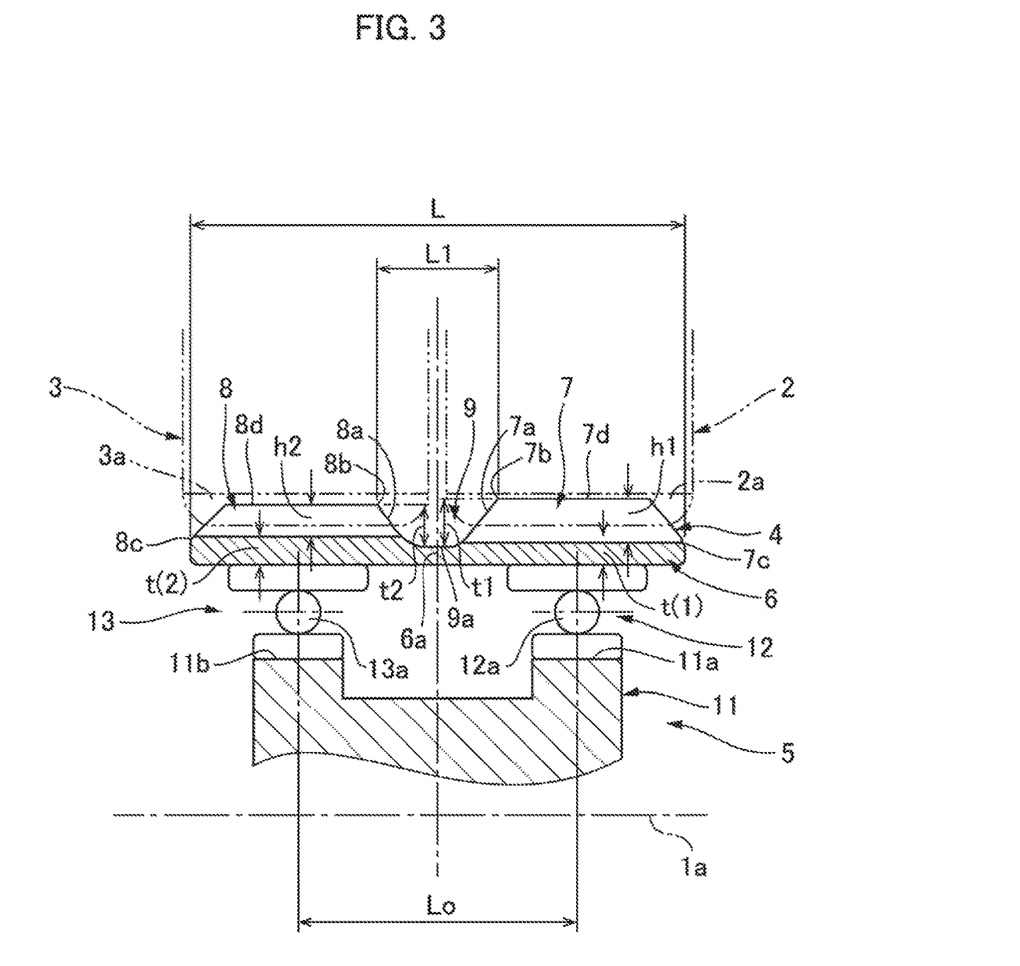
FIG. 3 is a partial enlarged cross-sectional view of the strain wave gearing shown in FIG. 1.

FIG. 3 is a partial enlarged cross sectional view of the strain wave gearing, which shows the externally toothed gear 4 as well as the first and second wave bearings 12 and 13 of the wave generator 5. The gap 9 formed between the first and second external teeth 7, 8 functions as a cutter clearance area for tooth-cutting cutters used for cutting the first and second external teeth 7, 8.

The first and second external teeth 7 and 8 will be explained at first. The first and second internal teeth 2a and 3a have substantially the same tooth width, and the first external teeth 7 and the second external teeth 8 having the same tooth width are formed in a symmetrical state with respect to the tooth-trace-direction central position 6a of the cylindrical body 6. When the first and second internal teeth differ in tooth width with each other, the first and second external teeth 7 and 8 will also differ in tooth width.

The gap 9 has a prescribed width along the tooth trace direction; the deepest part, which is the part of the gap 9 that is formed deepest along the tooth depth direction, is formed in the tooth-trace-direction central portion. In the present example, the deepest part 9a is a portion at which the tooth-trace-direction central portion is defined by a straight line extending parallel to the tooth trace direction, as viewed from the tooth-thickness direction. At the two tooth-trace-direction ends of the deepest part 9a, a concave arcuate curve that defines the tooth-trace-direction inner-end surface 7a of the first external teeth 7 and a concave arcuate curve that defines the tooth-trace-direction inner-end surface 8a of the second external teeth 8 are smoothly connected. It is also possible to adopt a configuration in which the deepest part 9a is defined by a concave curved surface and the two inner-end surfaces 7a, 8a are defined by inclined straight lines. It is furthermore possible to adopt a configuration in which the deepest part 9a is defined by a straight line and the two inner-end surfaces 7a, 8a are defined by inclined straight lines.

The tooth-trace-direction width of the gap 9 in the present example gradually increases from the deepest part 9a along the tooth depth direction. The maximum width L1 in the tooth trace direction is the distance, along the tooth trace direction, from the tooth-trace-direction inner end 7b of the addendum circle of the first external teeth 7 to the tooth-trace-direction inner end 8b of the addendum circle of the second external teeth 8.

The relationship $$0.1L < L1 < 0.3L$$

is established, where L is the width from the tooth-trace-direction outer end 7c of the first external teeth 7 to the tooth-trace-direction outer end 8c of the second external teeth 8, and L1 is the tooth-trace-direction maximum width of the gap 9.

The depth of the deepest part 9a of the gap 9 is set as follows. The relationships $$0.9h1 < t1 < 1.3h1 \text{ and}$$

$$0.9h2 < t2 < 1.3h2$$

are established, where h1 is the tooth depth of the first external teeth 7, h2 is the tooth depth of the second external teeth 8, t1 is the tooth-depth-direction depth from the top land 7d of the first external teeth 7 to the deepest part 9a, and t2 is the tooth-depth-direction depth from the top land 8d of the second external teeth 8 to the deepest part 9a.

Further, in the externally toothed gear 4 of the dual-type strain wave gearing 1, different tooth cutters are used to cut the first and second external teeth. For this reason, the gap 9 functioning as a cutter clearance area is formed in the tooth-trace-direction central portion of the externally toothed gear 4, namely, between the first and second external teeth 7 and 8.

The manner in which the gap 9 is formed has a prominent effect on the tooth contact of the first external teeth 7 with respect to the first internal teeth 2a along the tooth trace direction, as well as the tooth land load distribution. The manner in which the gap 9 is formed similarly has a prominent effect on the tooth contact of the second external teeth 8 with respect to the second internal teeth 3a along the tooth trace direction, as well as the tooth land load distribution.

In view of these points, the maximum width L1 of the gap 9 is set within a range of 0.1-0.3 times the width L of the externally toothed gear 4, and the maximum depths t1, t2 are set within a range of 0.9-1.3 times the tooth depths h1 h2 of the first and second external teeth 7 and 8. It was confirmed that forming the gap 9 in this manner makes it possible to maintain uniformity in the tooth-trace-direction tooth land load distributions of the first and second external teeth 7. 8 and to maintain a satisfactory state for the tooth contact of the first and second external teeth 7, 8 with respect to the first and second internal teeth 2a, 3a at each tooth-trace-direction position.

Accordingly, it is possible to realize a strain wave gearing having a speed ratio less than 30, and to realize a strain wave gearing having a high tooth bottom fatigue strength and a high load capacity.

[Distance Between Bearing-Ball Centers in Wave Generator]

The distance between the bearing-ball centers of the first and second wave bearings 12, 13 are described next with reference to FIG. 3.

In the rigid plug 11 of the wave generator 5, an ellipsoidally contoured first outer-peripheral surface 11a of fixed width is formed on one central-axis-direction side, and an ellipsoidally contoured second outer-peripheral surface 11b of fixed width is formed on the other central-axis-direction side. The first outer-peripheral surface 11a and the second outer-peripheral surface 11b are ellipsoidal outer-peripheral surfaces having the same shape and the same phase.

The first wave bearing 12 is fitted to the first outer-peripheral surface 11a in a state of being flexed in an ellipsoidal shape, and the second wave bearing 13 is fitted to the second outer-peripheral surface 11b in a state of being flexed in an ellipsoidal shape. The first and second wave bearings 12, 13 are of the same size.

The bearing centers 12a, 13a of the first wave bearing 12 and second wave bearing 13 are located at positions that are equidistant, along the tooth width direction, from the tooth-trace-direction central position 6a on the externally toothed gear 4. The distance between bearing-ball centers is set so as to increase correspondingly with an increase in the maximum width L1 of the gap 9. Furthermore, the inter-ball-center distance Lo is set so as to reach a value within the range indicated by the following formula, Lo being the distance between bearing-ball centers.

0.35L<Lo<0.7L

In the prior art, a wave generator having two rows of ball bearings is used in order to increase the area in which the externally toothed gear is supported. The two rows of ball bearings were arranged with respect to the tooth-width-direction central portion of the externally toothed gear, irrespective of the inter-ball-center distance.

In the present example, the inter-ball-center distance Lo between two rows of wave bearings 12, 13 is increased such that it is possible to increase rigidity for supporting first and second external teeth 7, 8 differing in number, and to improve the tooth contact of each of the external teeth 7, 8 with respect to internal teeth 2a, 3a at each tooth-trace-direction position. Specifically, as described above, a configuration is adopted in which the inter-ball-center distance Lo lengthens (increases) correspondingly with an increase in the tooth-trace-direction maximum length L1 of the gap 9, which is formed between the first and second external teeth 7, 8 and functions as a cutter clearance area. The range of increase of the inter-ball-center distance Lo is set to 0.35-0.7 times the width L of the externally toothed gear 4.

This makes it possible to arrange the first and second wave bearings 12, 13 such that the ball centers are positioned at suitable tooth-trace-direction positions with respect to each of the first and second external teeth 7, 8, in accordance with the width of the gap 9 that is formed. This makes it possible to reliably support the first and second external teeth 7, 8, using the first and second wave bearings 12, 13, at each tooth-trace-direction position of each of the first and second external teeth 7, 8 (i.e., to increase the supporting rigidity of the wave generator 5).

As a result, it is possible to improve the tooth contact of the first and second external teeth 7, 8 at each tooth-trace-direction position, and to increase the tooth bottom fatigue strength thereof. It is also possible to average the bearing-ball load distribution of each of the wave bearings 12, 13 of the wave generator 5, and to reduce the maximum load; therefore, the service life of the wave generator 5 can be improved.

(Amount by which the Externally Toothed Gear is Flexed)

The first and second external teeth 7 and 8 of the externally toothed gear 4 in the present example are both caused to flex in an ellipsoidal shape by the wave generator 5 having the two rows of wave bearings 12, 13. m1 is the module of the first external teeth 7, and m2 is the module of the second external teeth 8. $2n_1$ is the difference in number between the first external teeth 7 and the first internal teeth 2a, and $2n_2$ is the difference in number between the second external teeth 8 and the second internal teeth 3a. Therefore, the theoretical value $d_1$ of the amount by which the first external teeth 7 are radially flexed at major-axis positions Lmax and the theoretical value $d_2$ of the amount by which the second external teeth 8 are radially flexed when these external teeth are flexed in an ellipsoidal shape are respectively represented by the following.

$$d_1 = m_1 n_1$$

$$d_2 = m_2 n_2$$

In the present example, the amounts by which the first and second external teeth 7, 8 are radially flexed by the wave generator 5 are both set to the same amount d. The radial flexing amount d satisfies $$d = (d_1 + d_2)/\omega,$$

where $1.4 \leq \omega \leq 2.6$.

Figure 4A:
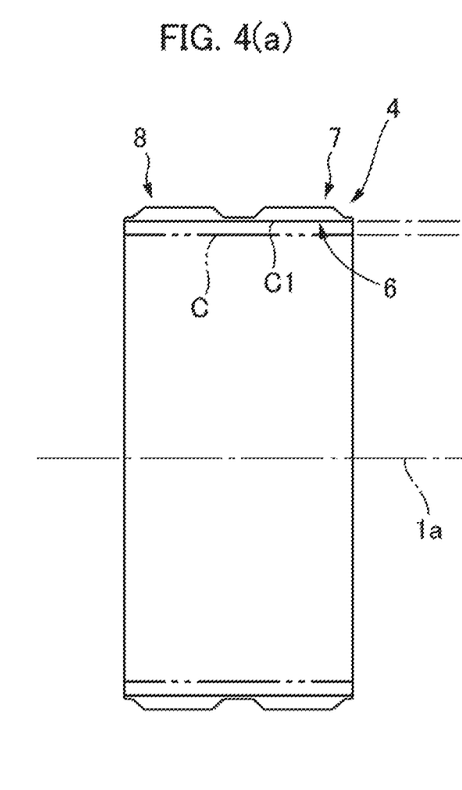
FIG. 4 is a diagram showing the flexed state of the externally toothed gear shown in FIG. 1.
Figure 4B:
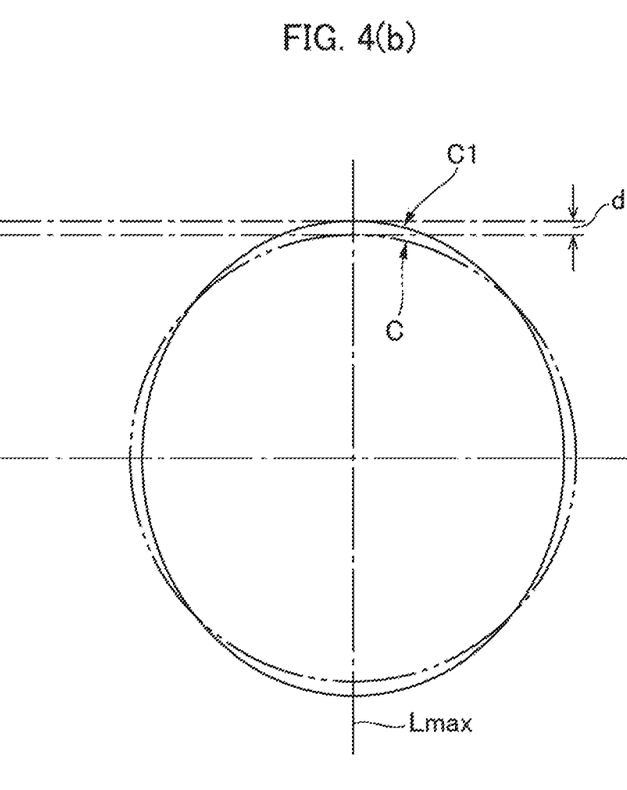

FIG. 4 is a diagram showing the flexed state of the externally toothed gear 4. In FIG. 4, the rim-neutral circle C is the circle passing through the thickness center of the cylindrical body (tooth bottom rim) 6 in a state in which the externally toothed gear 4 is perfectly circular prior to being flexed in an ellipsoidal shape. The rim-neutral circle C is deformed in an ellipsoidal shape due to the externally toothed gear 4 being flexed in an ellipsoidal shape. This deformed circle is referred to as the "ellipsoidal rim-neutral curve C1" The amount d by which the externally toothed gear 4 is radially flexed is the difference between the radius of the major axis Lmax of the ellipsoidal rim-neutral curve C1 and the radius of the rim-neutral circle C.

The amounts of radial flexing of the first and second external teeth 7 and 8 that differ in number are set to be the same value as described above. It was confirmed that the both external teeth 7 and 8 can be meshed with the corresponding internally toothed gears in a suitable manner, and that wear resistance and tooth bottom fatigue strength of the first and second external teeth can be enhanced.

[Other Embodiments]

In the example described above, the first internally toothed gear 2 is configured as a stationary-side internally toothed gear, and the second internally toothed gear 3 is configured as a drive-side internally toothed gear. Conversely, it is possible to instead configure the first internally toothed gear 2 as a drive-side internally toothed gear, and configure the second internally toothed gear 3 as a stationary-side internally toothed gear.

The invention claimed is:
1. A strain wave gearing comprising:
a rigid first internally toothed gear in which first internal teeth are formed;
a rigid second internally toothed gear in which second internal teeth are formed, the second internally toothed gear being disposed so as to be coaxially aligned in parallel with the first internally toothed gear;

a flexible externally toothed gear in which first external teeth capable of meshing with the first internal teeth and second external teeth capable of meshing with the second internal teeth are formed in the outer-peripheral surface of a radially flexible cylindrical body, the second external teeth differing in number from the first external teeth, and the externally toothed gear being disposed coaxially inside the first and second internally toothed gears; and a wave generator which causes the externally toothed gear to flex in an ellipsoidal shape, causing the first external teeth to partially mesh with the first internal teeth and causing the second external teeth to partially mesh with the second internal teeth;

wherein radial flexing amounts by which the first and second external teeth are flexed respectively by the wave generator are set to be a same radial flexing amount d; and the radial flexing amount d satisfies a relationship $$d=(d_1+d_2)/\omega,$$

$$1.4 \leq \omega \leq 2.6,$$

where $\omega$ is a coefficient;

where, when $m_1$ is a module of the first external teeth, $m_2$ is a module of the second external teeth, $n_1$ and $n_2$ are positive integers, $2n_1$ is a difference in number of teeth between the first external teeth and the first internal teeth, and $2n_2$ is a difference in number of teeth between the second external teeth and the second internal teeth, and $d_1$ is a theoretical value that is an amount by which the first external teeth are radially flexed at major-axis positions and $d_2$ is a theoretical value that is an amount by which the second external teeth are radially flexed when the external teeth are flexed in an ellipsoidal shape, the theoretical values $d_1$ and $d_2$ being respectively represented by $$d_1=m_1 n_1 \text{ and,}$$

$$d_2=m_2 n_2$$

wherein a gap is formed between a tooth-trace-direction inner-end surface of the first external teeth and a tooth-trace-direction inner-end surface of the second external teeth, the gap having a prescribed width along a tooth trace direction, and the gap having a deepest part along a tooth depth direction at a tooth-trace-direction central portion;

wherein a relationship $$0.1L<L1<0.3L$$

is satisfied, where L is a width from a tooth-trace-direction outer end of the first external teeth to a tooth-trace-direction outer end of the second external teeth, and L1 is a maximum width of the gap along a tooth trace direction; and wherein relationships $$0.9h1<t1<1.3h1 \text{ and}$$

$$0.9h2<t2<1.3h2$$

are satisfied, where h1 is a tooth depth of the first external teeth, h2 is a tooth depth of the second external teeth, t1 is a tooth-depth-direction depth from a tooth top land of the first external teeth to the deepest part, and t2 is a tooth-depth-direction depth from a tooth top land of the second external teeth to the deepest part.

2. The strain wave gearing according to claim 1, wherein the wave generator has a first wave bearing comprising a ball bearing for supporting the first external teeth, and a second wave bearing comprising a ball bearing for supporting the second external teeth;

wherein bearing-ball centers of the first wave bearing and the second wave bearing are located at positions that are equidistant, along the tooth trace direction, from a tooth-trace-direction center of the gap; and wherein, where an inter-ball-center distance Lo is a distance between the bearing-ball centers of the first and second wave bearings, the inter-ball-distance is set so as to increase correspondingly with an increase in the maximum width L1 of the gap, and satisfies a relationship $$0.35L<Lo<0.7L.$$

3. The strain wave gearing according to claim 1, wherein the number of the first external teeth differs from the number of the first internal teeth, and the number of second external teeth differs from the a number of second internal teeth.

4. The strain wave gearing according to claim 1, wherein the number of first external teeth is less than the number of first internal teeth, and the number of first internal teeth and the number of second internal teeth are equal to each other.

5. The strain wave gearing according to claim 1, wherein the wave generator is a rotation-inputting element; and either one of the first internally toothed gear and second internally toothed gear is a stationary-side internally toothed gear secured so as not to rotate, and the other of the first internally toothed gear and second internally toothed gear is a drive-side internally toothed gear that is a reduced-rotation-outputting element.

6. The strain wave gearing according to claim 1, wherein the wave generator has:

a rigid plug;

an ellipsoidally contoured outer-peripheral surface formed in an outer-peripheral surface of the plug;

a first wave bearing fitted to the outer-peripheral surface, the first wave bearing comprising ball bearings for supporting the first external teeth; and a second wave bearing fitted to the outer-peripheral surface, the second wave bearing comprising ball bearings for supporting the second external teeth.

* * * * *